(12) United States Patent
Chen

(10) Patent No.: US 6,439,013 B1
(45) Date of Patent: Aug. 27, 2002

(54) AUTOMOBILE LOCK

(76) Inventor: Tian-Yuan Chen, P.O. Box 90, Tainan City (TW)

( * ) Notice: Subject to any disclaimer, the term of this patent is extended or adjusted under 35 U.S.C. 154(b) by 0 days.

(21) Appl. No.: 09/816,448

(22) Filed: Mar. 26, 2001

(51) Int. Cl.[7] ............................................. B60R 25/00
(52) U.S. Cl. ........................................... 70/202; 70/237
(58) Field of Search ........................... 70/198–203, 237, 70/238, 254

(56) References Cited

U.S. PATENT DOCUMENTS

| | | | | |
|---|---|---|---|---|
| 5,267,458 A | * | 12/1993 | Heh | 70/202 X |
| 5,345,796 A | * | 9/1994 | Chieh et al. | 70/202 |
| 5,537,846 A | * | 7/1996 | Simon | 70/202 |
| 5,715,710 A | * | 2/1998 | De Lucia et al. | 70/202 |
| 5,881,587 A | * | 3/1999 | Vito | 70/202 |
| 5,906,121 A | * | 5/1999 | Mankarious | 70/202 X |
| 5,979,197 A | * | 11/1999 | Mellini et al. | 70/202 X |
| 6,089,055 A | * | 7/2000 | Vito | 70/202 |
| 6,192,724 B1 | * | 2/2001 | Vito | 70/202 |
| 6,202,456 B1 | * | 3/2001 | Vickers | 70/202 |
| 6,298,696 B2 | * | 10/2001 | Vito | 70/202 |

* cited by examiner

*Primary Examiner*—Lloyd A. Gall

(57) ABSTRACT

An automobile lock includes a tubular body having on an upper portion a lock housing with a lock member, and a bottom base fixed on the bottom of the tubular body. The tubular body has an elongate slot extending to the bottom base, a telescopic rod fitted inside the tubular body and having a plurality of grooves extend circularly around the rod, and a pull grip bending to a certain angle on top. Besides, the telescopic rod is provided with a toggle near its bottom, and a stop member bends to one side having a vertical stop plate fixed on an end. In handling, place the bottom base under a pedal brake, and then pull up the telescopic rod to permit its stop member to restrict and hold against the pedal brake tightly so as to acquire effectiveness of antitheft.

1 Claim, 3 Drawing Sheets

AUTOMOBILE LOCK

BACKGROUND OF THE INVENTION

1. Field of the Invention

This invention relates to an automobile lock, particularly to one consisting of a bottom base positioned under a pedal brake in an automobile, a telescopic rod to be pulled up to let the connect rod of the pedal brake restricted and held immovable between a stop plate and an elongate tubular body of the automobile lock, thus rendering the pedal brake unable to move any more and attaining the goal of antitheft.

2. Description of the Prior Art

In general, a conventional lock attached to a steering wheel of an automobile or a stick lock 3 with one end clasping a steering wheel 1 and the other end clasping a pedal brake 2 is commonly used for antitheft, as shown in FIG. 1, but the conventional steering wheel lock does not have good effect in antitheft because they are easily broken and detached by sawing.

SUMMARY OF THE INVENTION

The objective of the invention is to offer an automobile lock possible to tightly hold against a pedal brake of an automobile impossible to be moved a bit by stepping, and easy to attain effectiveness of antitheft.

The feature of the invention is an elongate tubular body provided on an upper portion with a lock housing having a lock member, the tubular body fixed at a bottom with a bottom base and bored an elongated slot extending to the bottom base and also a telescopic rod with a plurality of grooves extend circularly around the rod moving up and down in the tubular body, and further a pull grip bending to a certain angle on top as well as a stop member at a bottom bending and protruding out with a vertical stop plate fixed on an end of the stop member.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
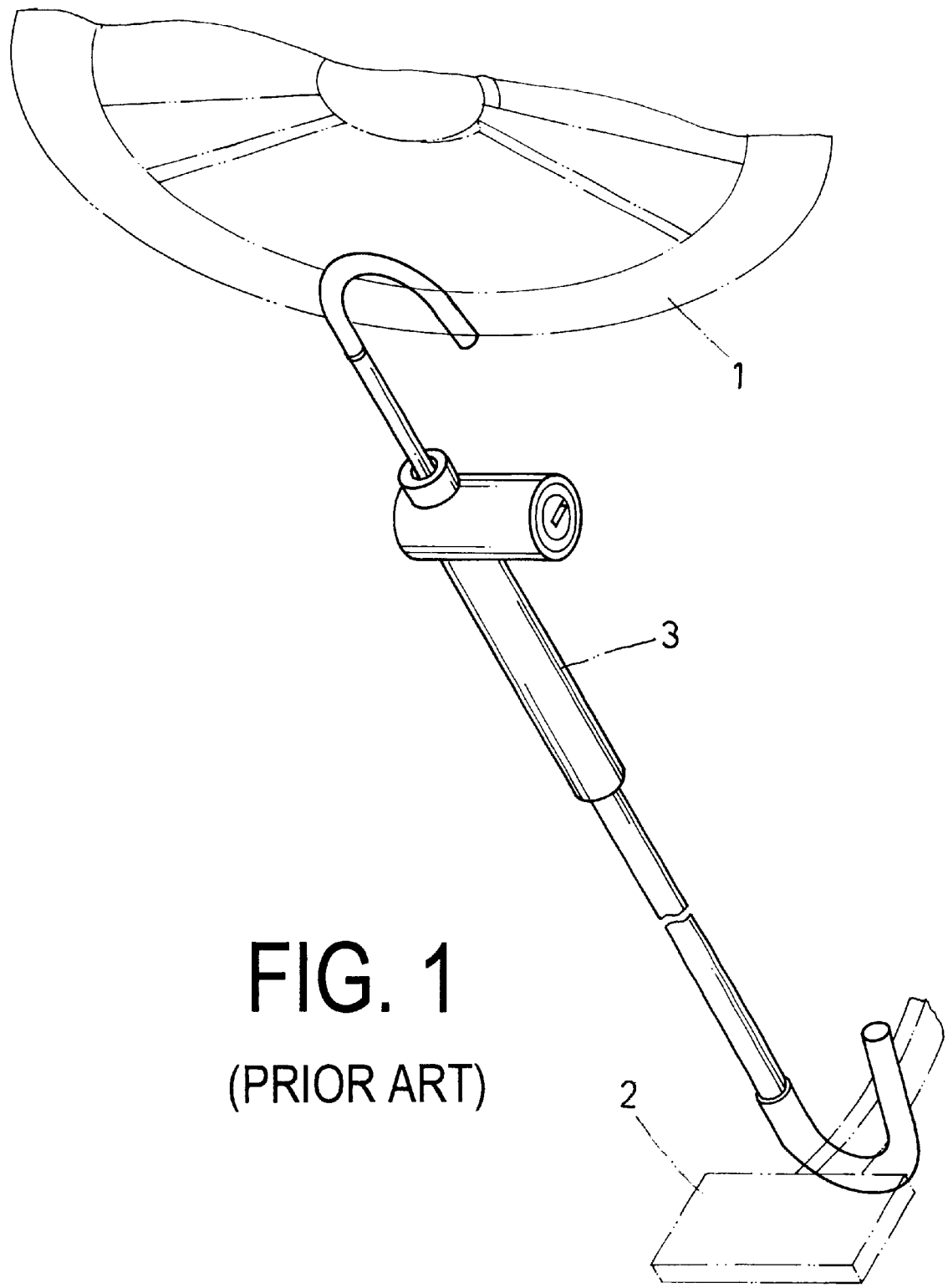
FIG. 1 is a perspective view of a known conventional automobile lock.
Figure 2:
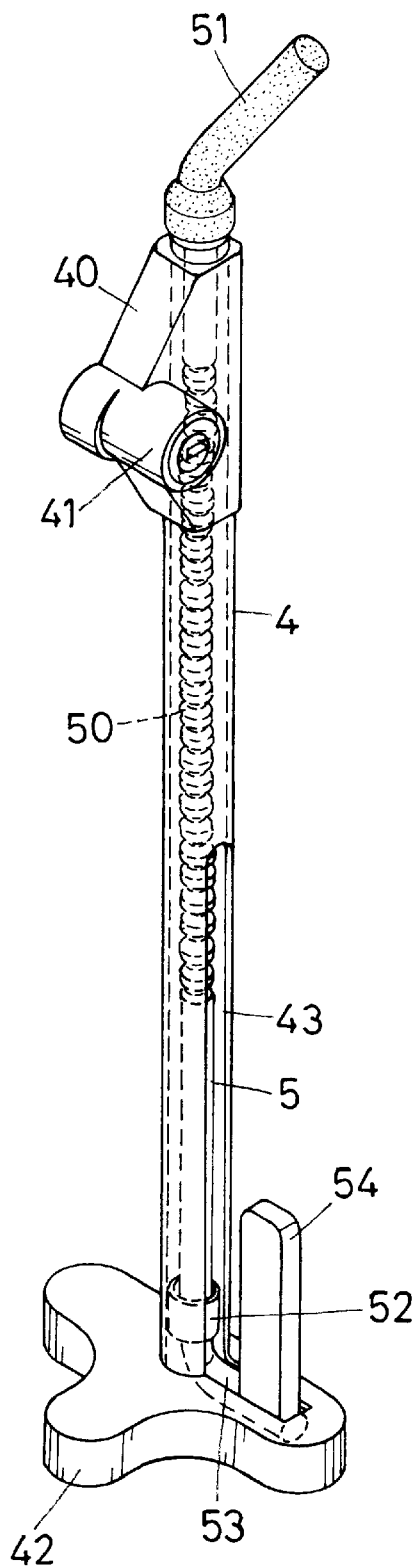
FIG. 2 is a perspective view of an automobile lock in the present invention; and, FIG. 3 is a perspective view of the automobile lock in using process in the present invention.

An automobile lock in the present invention, as shown in FIG. 2, includes an elongate tubular body 4, a bottom base 42, a lock housing 40 and a pull grip 51 as main components combined together.

The lock housing 40 is provided on an upper portion of the tubular body 4, having a lock member 41 protruding out to a side portion, and the bottom base 42 is disposed at the bottom of the tubular body 4. Further, the tubular body 4 has an L-shaped slot 43 bored extending to the bottom base 42, and a telescopic rod 5 fitted in the interior of tubular body 4, having a plurality of grooves extend circularly around the rod 50 formed slant to one side. Further a pull grip 51 is provided to extend upward from an upper end of the tubular body 4, bending to a certain angle 4 and combined with the telescopic rod 5. In addition, the telescopic rod 5 has a toggle 52 fixed around near its bottom, and a stop member 53 bends and protrudes from the bottom of the telescopic rod 5, and a stop plate 54 is disposed upright and parallel to the tubular body 4.

Figure 3:
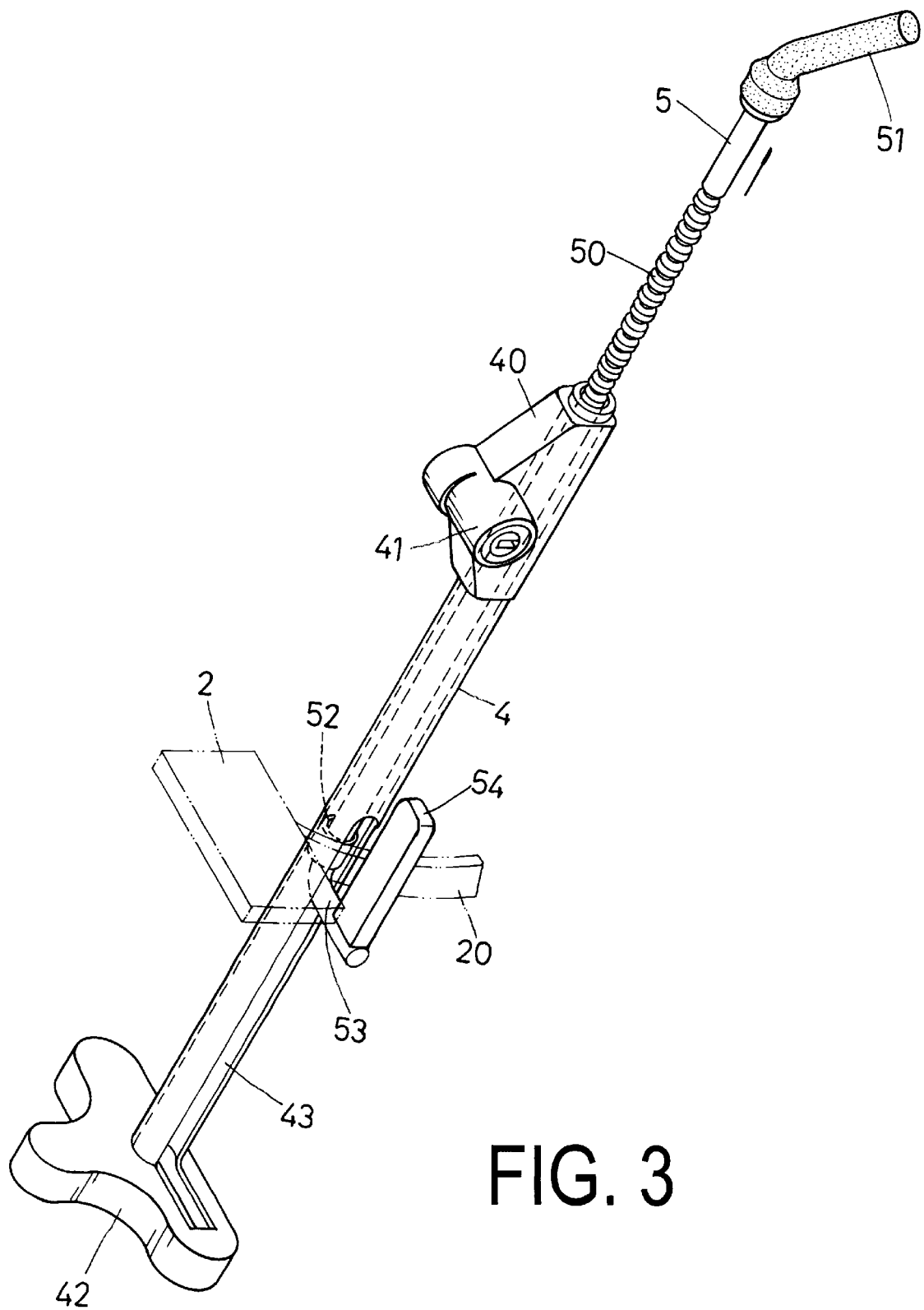

In using and handling, referring to FIG. 3, just put the bottom base 42 under a pedal brake 2, and then pull up the pull grip 51 together with the telescopic rod 5 to synchronously activate the stop member 53 and the stop plate 54 under the telescopic rod 5 to move upward to restrict and firmly hold against the end of the connect rod 20 of the pedal brake 2 so that the pedal brake 2 is kept immovable by stepping, thus acquiring effectiveness of antitheft, and avoiding the defect that the known conventional steering wheel lock 3 is easily broken and detached by sawing.

On the contrary, to unlock the automobile lock of this invention, merely unlock the lock member 41 to permit a locking pin inside disengaging from one of the engage groove 50 of the telescopic 5 and enable the telescopic rod 5 together with its stop member 53 and stop plate 54 to move downward to let the stop member 53 and the stop plate 54 separated from under the connect rod of the brake pedal 2.

Furthermore, the toggle 52 fixed around near the bottom of the telescopic rod 5 functions to keep the telescopic rod steadily move up and down inside the tubular body 4, and also prevents the telescopic rod 5 from getting out of the elongated slot 43.

While the preferred embodiment. of the invention has been described above, it will be recognized and understood that various modifications may be made therein and the appended claims are intended to cover all such modifications that may fall within the spirit and scope of the invention.

What is claimed is:

1. An automobile lock comprising:

an elongate tubular body provided on an upper portion with a lock housing having a locking member, said tubular body fixed with a bottom base at its bottom and having an elongated slot extending to said bottom, said tubular body further fitted inside with a telescopic rod having a plurality of grooves extend circularly around the rod, said telescopic rod having a pull grip extending upward and bending through a certain angle, and also a stop member provided at a bottom bending and protruding to one side, said stop member having a vertical stop plate disposed on its end:

wherein said telescopic rod has a toggle provided fixedly near a bottom side of said telescopic rod, and said toggle cause said telescopic rod to move up and down steadily in said tubular body so that said telescopic rod is prevented from separating from said elongated slot;

said elongated slot extending to said bottom base is L-shaped;

in operating, firstly said bottom base placed closely under a pedal brake in an automobile, then said pull grip pulled up together with said telescopic rod to cause a connect rod of said pedal brake to be restricted between said stop plate and said tubular body and kept firmly by said stop member under said telescopic rod, said pedal brake then impossible to be stepped down, thus attaining goal of anti-theft.

\* \* \* \* \*